United States Patent
Ciodaru et al.

(10) Patent No.: US 10,193,773 B2
(45) Date of Patent: Jan. 29, 2019

(54) METHODS, SYSTEMS, AND COMPUTER READABLE MEDIA FOR DISTRIBUTED NETWORK PACKET STATISTICS COLLECTION IN A TEST ENVIRONMENT

(71) Applicant: Ixia, Calabasas, CA (US)

(72) Inventors: Florin Ciodaru, Chapel Hill, NC (US); Serif Narcis Abdulamit, Woodland Hill, CA (US); Nicolae Sorin Fetche, Newbury Park, CA (US); Rajesh Kumar Paramasivan, Oak Park, CA (US)

(73) Assignee: KEYSIGHT TECHNOLOGIES SINGAPORE (HOLDINGS) PTE. LTD., Singapore (SG)

( * ) Notice: Subject to any disclaimer, the term of this patent is extended or adjusted under 35 U.S.C. 154(b) by 228 days.

(21) Appl. No.: 15/347,756

(22) Filed: Nov. 9, 2016

(65) Prior Publication Data

US 2018/0131586 A1 May 10, 2018

(51) Int. Cl.
*H04L 12/26* (2006.01)
*H04L 29/08* (2006.01)

(52) U.S. Cl.
CPC ............ *H04L 43/062* (2013.01); *H04L 43/50* (2013.01); *H04L 67/2809* (2013.01); *H04L 67/10* (2013.01)

(58) Field of Classification Search
CPC ....... H04L 43/062; H04L 43/50; H04L 67/10; H04L 67/2809
See application file for complete search history.

(56) References Cited

U.S. PATENT DOCUMENTS

| | | |
|---|---|---|
| 5,343,463 A | 8/1994 | Van Tetering et al. |
| 5,477,531 A | 12/1995 | McKee et al. |
| 5,600,632 A | 2/1997 | Schulman |
| 5,742,760 A | 4/1998 | Picazo, Jr. et al. |
| 5,787,283 A | 7/1998 | Chin et al. |
| 5,850,386 A | 12/1998 | Anderson et al. |
| 5,878,032 A | 3/1999 | Mirek et al. |
| 5,982,753 A | 11/1999 | Pendleton et al. |
| 6,028,847 A | 2/2000 | Beanland |
| 6,041,053 A | 3/2000 | Douceur et al. |

(Continued)

OTHER PUBLICATIONS

Ixia, "Specifications for Load Modules—Multilayer Gigibit Ethernet for LM1000LX, LM1000SX, LM1000GBIC, LM1000T, Product Specification Sheet," pp. 1-2 (2002).

(Continued)

*Primary Examiner* — Edan Orgad
*Assistant Examiner* — Nourali Mansoury (57) ABSTRACT

A method for distributed network packet statistics collection includes instantiating first and second operations that implement different portions of a network packet statistics collection task on processing nodes implemented on different processors in a network packet statistics collection system. The method includes utilizing an auto-discovery mechanism for the second operation to subscribe to a set of capabilities and identify the first operation as a matching operation. The method further includes establishing a channel between the first and second operations. The method further includes executing the network packet statistics collection task, where the first and second operations perform the different portions of the network packet statistics collection task.

19 Claims, 8 Drawing Sheets

(56) References Cited

U.S. PATENT DOCUMENTS

| | | | |
|---|---|---|---|
| 6,065,053 A | 5/2000 | Nouri et al. | |
| 6,088,777 A | 7/2000 | Sorber | |
| 6,172,989 B1 | 1/2001 | Yanagihara et al. | |
| 6,233,256 B1 | 5/2001 | Dieterich et al. | |
| 6,252,891 B1 | 6/2001 | Perches | |
| 6,295,557 B1 | 9/2001 | Foss et al. | |
| 6,360,332 B1 | 3/2002 | Weinberg et al. | |
| 6,446,121 B1 | 9/2002 | Shah et al. | |
| 6,545,979 B1 | 4/2003 | Poulin | |
| 6,601,098 B1 | 7/2003 | Case et al. | |
| 6,717,917 B1 | 4/2004 | Weissberger et al. | |
| 6,728,929 B1 | 4/2004 | Luong | |
| 6,789,100 B2 | 9/2004 | Nemirovsky et al. | |
| 6,820,034 B2 | 11/2004 | Hanes et al. | |
| 6,823,219 B2 | 11/2004 | Lee et al. | |
| 6,888,818 B1 | 5/2005 | Gubbi | |
| 6,910,061 B2 | 6/2005 | Hu et al. | |
| 6,950,405 B2 | 9/2005 | Van Gerrevink | |
| 7,007,089 B2 | 2/2006 | Freedman | |
| 7,035,223 B1 | 4/2006 | Burchfiel et al. | |
| 7,088,735 B1 | 8/2006 | Roehr, Jr. et al. | |
| 7,187,683 B1 | 3/2007 | Sandoval et al. | |
| 7,295,555 B2 | 11/2007 | Elzur | |
| 7,406,089 B1 | 7/2008 | Rahim et al. | |
| 7,443,870 B2 | 10/2008 | Zioulas et al. | |
| 7,451,458 B2 | 11/2008 | Tuchow | |
| 7,489,706 B2 | 2/2009 | Hatley et al. | |
| 7,561,559 B2 | 7/2009 | Hannel et al. | |
| 7,594,159 B2 | 9/2009 | Fujikami et al. | |
| 7,643,431 B2 | 1/2010 | Pepper | |
| 7,826,377 B2 | 11/2010 | Pepper | |
| 7,826,381 B1 | 11/2010 | Kastuar et al. | |
| 8,050,175 B2 | 11/2011 | Pepper | |
| 8,219,675 B2 | 7/2012 | Ivershen | |
| 8,310,942 B2 | 11/2012 | Gintis et al. | |
| 8,391,157 B2 | 3/2013 | Ginsberg et al. | |
| 8,582,466 B2 | 11/2013 | Gintis et al. | |
| 9,531,620 B2 | 12/2016 | Ciodaru et al. | |
| 9,553,786 B2 | 1/2017 | Bergeron | |
| 9,654,303 B2* | 5/2017 | Joyner | H04L 12/4633 |
| 2001/0016867 A1 | 8/2001 | Hu et al. | |
| 2002/0172158 A1 | 11/2002 | Hoefelmeyer et al. | |
| 2002/0183969 A1 | 12/2002 | Hanes et al. | |
| 2003/0033025 A1 | 2/2003 | Lee et al. | |
| 2004/0037277 A1 | 2/2004 | Mathews et al. | |
| 2004/0052259 A1 | 3/2004 | Garcia et al. | |
| 2004/0131013 A1 | 7/2004 | Ise et al. | |
| 2004/0158744 A1 | 8/2004 | Deng et al. | |
| 2004/0252686 A1 | 12/2004 | Hooper et al. | |
| 2005/0013251 A1 | 1/2005 | Wang et al. | |
| 2005/0286564 A1 | 12/2005 | Hatley et al. | |
| 2006/0088060 A1 | 4/2006 | Fujikami et al. | |
| 2006/0153078 A1 | 7/2006 | Yasui | |
| 2007/0115833 A1 | 5/2007 | Pepper et al. | |
| 2007/0195707 A1* | 8/2007 | Cidon | H04L 43/50 370/252 |
| 2007/0291654 A1 | 12/2007 | Pepper | |
| 2008/0112332 A1 | 5/2008 | Pepper | |
| 2008/0317233 A1 | 12/2008 | Rey et al. | |
| 2009/0310491 A1 | 12/2009 | Ginsberg et al. | |
| 2010/0069092 A1 | 3/2010 | Bajpai et al. | |
| 2010/0074135 A1 | 3/2010 | Pepper | |
| 2011/0078319 A1 | 3/2011 | Ishida | |
| 2012/0051234 A1 | 3/2012 | Gintis et al. | |
| 2013/0331082 A1 | 12/2013 | Topaltzas et al. | |
| 2013/0343389 A1* | 12/2013 | Stroud | H04L 45/72 370/392 |
| 2013/0346628 A1* | 12/2013 | Canion | H04L 63/0876 709/245 |
| 2013/0346719 A1* | 12/2013 | Tomlinson | G06F 12/10 711/165 |
| 2013/0346736 A1* | 12/2013 | Cook | G06F 9/4416 713/2 |
| 2013/0346987 A1* | 12/2013 | Raney | G06F 9/5044 718/102 |
| 2013/0347103 A1* | 12/2013 | Veteikis | H04L 43/04 726/22 |
| 2014/0016479 A1 | 1/2014 | Coomber et al. | |
| 2014/0269337 A1 | 9/2014 | Gintis | |
| 2016/0057040 A1 | 2/2016 | Bergeron | |
| 2017/0164186 A1* | 6/2017 | Yong | H04W 8/005 |
| 2017/0272352 A1 | 9/2017 | Badea et al. | |
| 2018/0013839 A1 | 1/2018 | Noldus et al. | |

OTHER PUBLICATIONS

Ixia, "Ixia 200 Chassis, Product Description," pp. 1 (1999).

Notice of Allowance and Fee(s) Due, Applicant-Initated Interview Summary and AFCP 2.0 Decision for U.S. Appl. No. 14/465,453 (dated Sep. 14, 2016).

Final Office Action for U.S. Appl. No. 14/465,453 (dated Jun. 16, 2016).

Applicant-Initiated Interview Summary for U.S. Appl. No. 14/465,453 (dated Mar. 3, 2016).

Applicant-Initiated Interview Summary for U.S. Appl. No. 14/465,453 (dated Mar. 1, 2016).

Non-Final Office Action for U.S. Appl. No. 14/465,453 (dated Dec. 18, 2015).

Krishnan, "Flow-aware Real-time SDN Analytics (FRSA)," http://blog.sflow.com/2014/02/flow-aware-real-time-sdn-analytics-frsa.html, pp. 1-12 (Feb. 5, 2014).

Non-Final Office Action for U.S. Appl. No. 15/077,832 (dated Apr. 3, 2018).

Notice of Allowance and Fee(s) Due for U.S. Appl. No. 12/870,729 (dated Aug. 31, 2012).

Non-Final Office Action for U.S. Appl. No. 12/870,729 (dated Jul. 2, 2012).

European Search Report for European Patent Application Serial No. 11008066.0 (dated Feb. 10, 2012).

Notice of Allowance and Fee(s) Due for U.S. Appl. No. 12/627,925 (dated Aug. 26, 2011).

Examiner Initiated Interview Summary and Final Office Action for U.S. Appl. No. 12/627,925 (dated Jun. 17, 2011).

Non-Final Office Action for U.S. Appl. No. 12/627,925 (dated Jan. 21, 2011).

Notice of Allowance and Fee(s) Due for U.S. Appl. No. 11/558,855 (dated Nov. 18, 2009).

Final Office Action for U.S. Appl. No. 11/558,855 (dated Oct. 15, 2009).

Non-Final Office Action for U.S. Appl. No. 11/558,855 (dated Mar. 24, 2009).

Sadasivan et al., "Architecture for IP Flow Information Export," Network Working Group, pp. 1-31 (Mar. 2009).

Ixia, "IxExplorer User's Guide," Revision 2.1.0, pp. 1-384 (Nov. 1, 1999).

Ixia, "Specifications for Load Modules—Multilayer Gigibit Ethernet for LM1000LX, LM1000SX, LM1000GBIC, LM1000T, Product Specification Sheet," pp. 1-2 (Undated).

Ixia, "The Ixia 200 Traffic Generator and Analyzer, Product Description," pp. 1-2 (1997-1999).

Brownlee et al., "Traffic Flow Measurement: Architecture," Network Working Group, The University of Auckland, GTE Laboratories, Inc. and GTE Internetworking, pp. 1-49 (Oct. 1999).

Ixia, "Ixia 200 Chassis, Product Description," pp. 1 (Undated).

Commonly-assigned, co-pending U.S. Appl. No. 15/826,628 for "Methods, Systems, and Computer Readable Media for Network Traffic Statistics Collection," (Unpublished, filed Nov. 29, 2017).

* cited by examiner

METHODS, SYSTEMS, AND COMPUTER READABLE MEDIA FOR DISTRIBUTED NETWORK PACKET STATISTICS COLLECTION IN A TEST ENVIRONMENT

TECHNICAL FIELD

The subject matter described herein relates to collecting statistics based on network packets. More particularly, the subject matter described herein relates to methods, systems, and computer readable media for distributed network packet statistics collection in a test environment.

BACKGROUND

Network packet statistics collection is performed by test systems that transmit simulated packets to one or more devices under test. For example, one type of test system transmits simulated packets a device under test over different network ports of the test system, receives packets from the device under test, and generates statistics grouped by packet group identifiers inserted in the packets by the test system. In some tests, multiple statistics may be generated for each packet group identifier. Generating statistics for a packet group identifier may include looking up the packet group identifier in a table, locating the column in the table containing the statistic to be updated, and updating the statistic. As the number of packet group identifiers increases, the size of the statistics table increases and the amount of processing required to insert a statistic in the table also increase. In addition, as the table size increases, operations on the table, such as sorting, grouping, inserting, etc. require an increased amount of processing resources and/or time to complete.

In one exemplary network packet statistics collection system, packet statistics are collected on a per port basis in the test system chassis. The port processor associated with each port collects statistics for that port and forwards the statistics to a client device for merging with statistics from other ports and report generation. As the number of ports in a test increases, the amount of processing required to be performed by the client device also increases. As a result, the capacity of the client processor to perform statistics processing can limit the scalability of the test system.

Accordingly, there exists a need for distributed network packet statistics collection in a test environment.

SUMMARY

Methods, systems, and computer readable media for distributed network packet statistic collection in a test environment are disclosed. One method for distributed network packet statistics collection includes instantiating first and second operations that implement different portions of a network packet statistics collection task on processing nodes implemented on different processors in a network packet statistics collection system. The method includes utilizing an auto-discovery mechanism for the second operation to subscribe to a set of capabilities and identify the first operation as a matching operation. The method further includes establishing a channel between the first and second operations. The method further includes executing the network packet statistics collection task, where the first and second operations perform the different portions of the network packet statistics collection task.

A system for distributed network packet statistics collection in a test environment is also disclosed. The system includes a network packet statistics collection system including a chassis and a client, each including a processor. The system includes first and second processing nodes for executing on one or more of the processors. The system further includes first and second operations that implement different portions of a network packet statistics collection task for executing on the first and second processing nodes. The first and second operations are configured to utilize an auto-discovery mechanism for the second operation to subscribe to a set of capabilities and identify the first operation as a matching operation. The first and second operations are configured to connect to each other and execute the network packet statistics collection task, where the first and second operations perform the different portions of the network packet statistics collection task.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
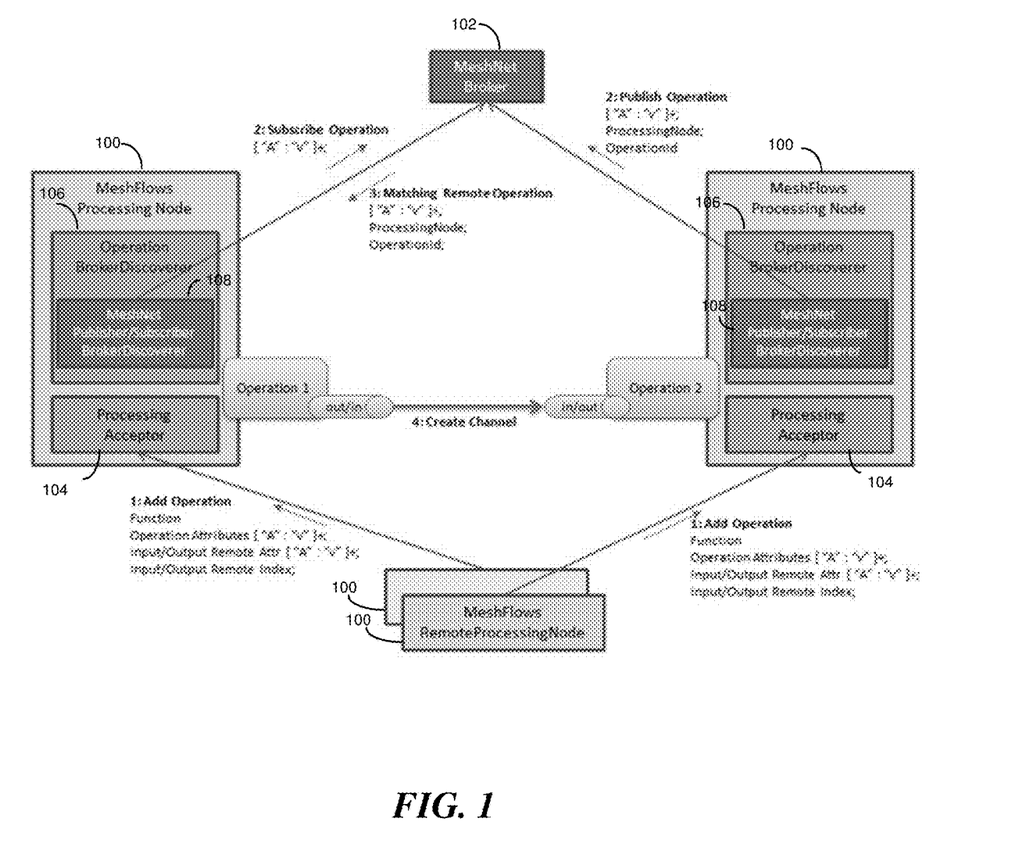
FIG. 1 is a block and message flow diagram illustrating an operation discovery and connection phase of a network packet statistics collection task.

FIG. 1 is a block diagram illustrating a distributed network packet statistics collection system according to an embodiment of the subject matter described herein. Rather than manually and statically allocating statistics collection to a single processor or group of processors in a network packet statistics system, the subject matter described herein includes a discovery mechanism where a statistics collection task can be broken into multiple operations implemented on different processors, and the processors may automatically discover and connect to each other to implement the network packet statistics collection task. Referring to FIG. 1, a plurality of processing nodes 100, referred to herein as mesh flows processing nodes, may be implemented on different physical or virtual processors in a network equipment test system. Each mesh flows processing node 100 includes the capability to execute a portion of a network packet statistics collection task and to discover and connect to other mesh flows processing nodes that implement different portions of the network packet statistics collection task. In addition, the system includes a broker 102 that facilitates auto-discovery of matching operations implemented on different nodes.

As used herein, the term "operation" refers to an entity that implements a portion of a network packet statistics collection task. An operation may be implemented in software. One example of an operation that implements a network packet statistics collection task may be an operation that counts packets having a particular source address. Another operation may count packets having a particular destination address.

As used herein, the term "network packet statistics collection task" refers to any task associated with collecting or generating data based on test packets transmitted between a test system and a device under test. Examples of statistics that may be collected for internet protocol packets include session identifier, session state, topology ID, port ID, device group ID, protocol ID, and protocol type. Such information may be collected and stored in a table. Network packet statistics collection may include performing operations based on the table, including grouping, sorting, inserting, deleting, etc.

In the illustrated example, each processing node 100 includes a processing acceptor 104 that accepts allocation of operations from other processing nodes. Each processing node 100 also includes an operation/broker discover 106 for discovering and communicating with broker 102 and other operations. Each operation/broker discoverer 106 further includes an operation publisher/subscriber 108 for publishing details about operations implemented on the respective processing node and subscribing to operations implemented on remote processing nodes.

The message flow illustrated in FIG. 1 provides an example of how operations can be allocated among different processing nodes and how operations on different processing nodes discover each other. Referring to the message flow in FIG. 1, in message 1, a remote processing node 100 transmits add operations messages to other processing nodes to instantiate operations on the processing nodes. The operations are illustrated in FIG. 1 as operation 1 and operation 2. The operations may implement different parts of a network packet statistics collection task. For example, one operation may be to collect session statistics for IPv4 packets and the other operation may be to collect session statistics for IPv6. The add operation messages are sent to processing acceptors 104 on two processing nodes 100. Each operation may include attributes so that the operation can be found or discovered by other operations. In FIG. 1, the add operation messages received by processing acceptors 104 include attribute A with value v. The add operation messages further include an index usable by the node that transmitted the add operation messages to identify the operation. In this example, it is assumed that processing acceptors 104 each accept the request to add an operation.

Once a processing node accepts an operation, the operation publisher/subscriber 108 publishes or subscribes to an operation by transmitting a publish or subscribe message with operation-identifying attributes to broker 102. In the illustrated example, the processing node associated with operation 2 publishes the details of operation 2 to broker 102. Processing node 100 associated with operation 1 subscribes to particular operation attributes by transmitting a subscribe message with operation-identifying attributes to broker 102. Upon receiving the published operation and subscribe operation messages, broker 102 determines whether the attributes of a publishing operation match those of a subscribing operation. In the illustrated example, operation 2 publishes attribute A with value v. Operation 1 subscribes to an operation with attribute A and value v. Accordingly, because the attributes match, broker 102 determines that the operations match and transmits a matching remote operation message to operation 1 identifying the remote processing node and the operation on the remote processing node that matches the subscription request. The matching remote operation message includes information sufficient for the subscribing operation to connect to the publishing operation.

Once operation 1 has discovered operation 2, operation 1 creates a channel to operation 2 to be used in the test. Creating a channel may include operation 1 acting as a channel initiator and initiating a connection with operation 2, which acts as a channel acceptor. The channel may be a transport or other layer connection. It should also be noted that the initiator/acceptor sides of a channel are independent from the input/output sides, even though in the illustrated example operation 1 is providing output to operation 2. The accepting side of the channel is identified by the operation instance and input/output index to which the channel should connect. Attributes are used to find the family of potential operation instances from which to select the actual channel remote endpoint.

Once a channel is connected between the operations, a network test may be executed and the operations may perform their respective portions of the network packet statistics collection task. For example, packets may be forwarded to processing node 100 where operation 1 implements its portion of the packet statistics collection task. The packets may then be forwarded to operation 2 over the created channel where operation 2 performs its respective portion of the network packet statistics collection task. Alternatively, if the network packet statistics collection task is a high level table sort followed by a lower level sort, operation 1 may perform the high level sort, forward the sorted packet statistics table to operation 2, which further sorts the table received from operation 1. If a processing node or a channel fails, the discovery process illustrated in FIG. 1 may be repeated to discover new matching operations and establish a failover channel between the operation initiator and acceptor.

Figure 2:
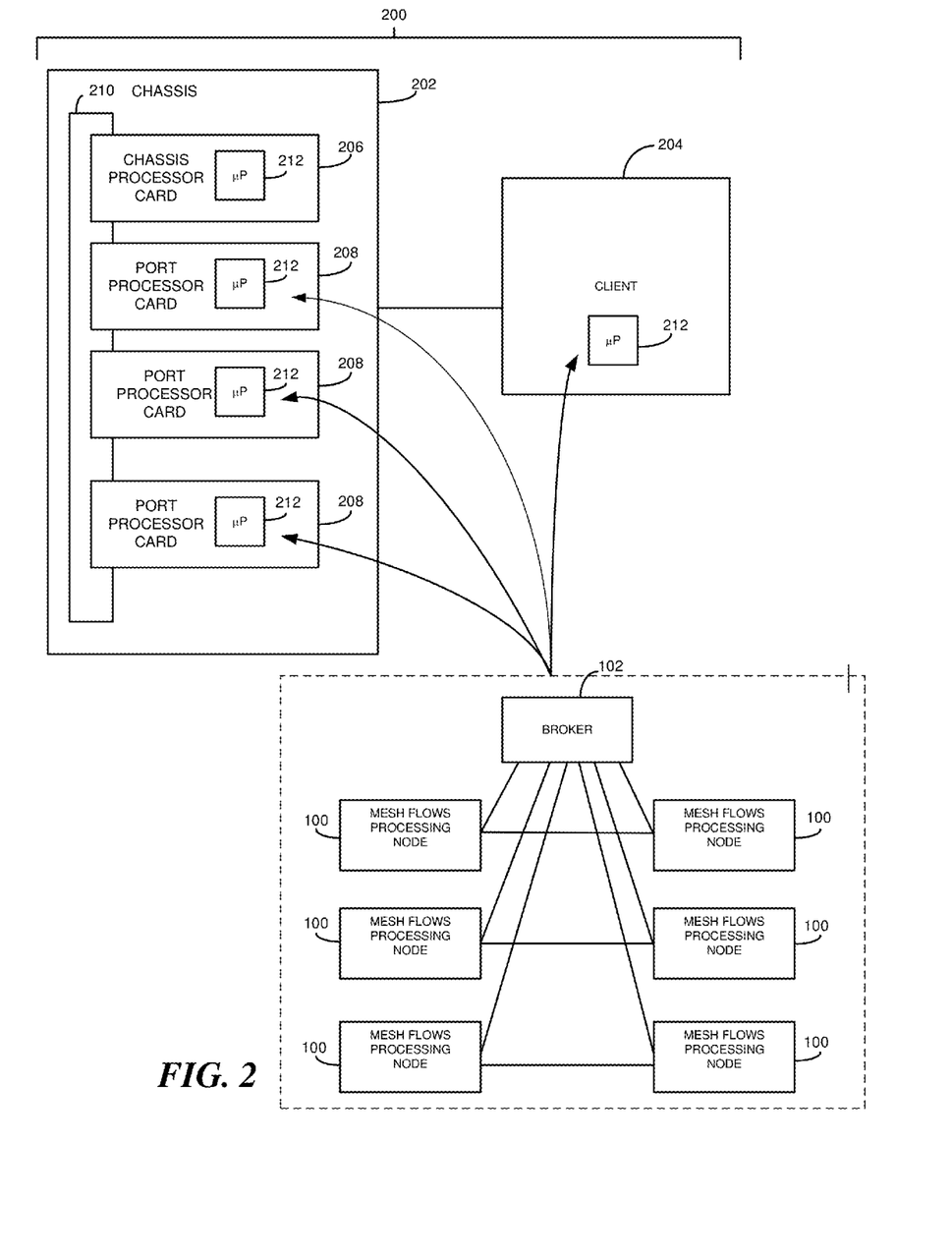
FIG. 2 is a block diagram illustrating assignment of mesh flows processing nodes and brokers to different processors in a network packet statistics collection system.

FIG. 2 is a block diagram illustrating an exemplary operating environment for the subject matter described herein. Referring to FIG. 2, mesh flows processing nodes 100 may be created along with broker 102 and allocated among processors of a network equipment test system 200. In the illustrated example, network equipment test device 200 includes a chassis 202 and a client 204. Chassis 202 includes a physical enclosure for processor cards of network packet statistics collection system 100, electronic interconnections for the processor cards, and physical ports that allow the processor cards to connect to a network via optical or electrical cables. In the illustrated example, chassis 202 includes a chassis card 206 and a plurality of port processor cards 208 interconnected via a backplane 210. Each of client 204, chassis processor card 206, and port processor cards 208 includes one or more microprocessors 212. Broker 102 and mesh flows processing nodes 100 may be created and allocated among processors 212. After initial allocation, processing nodes 100 and their associated operations may connect with each other using the discovery process illustrated in FIG. 1.

Figure 3:
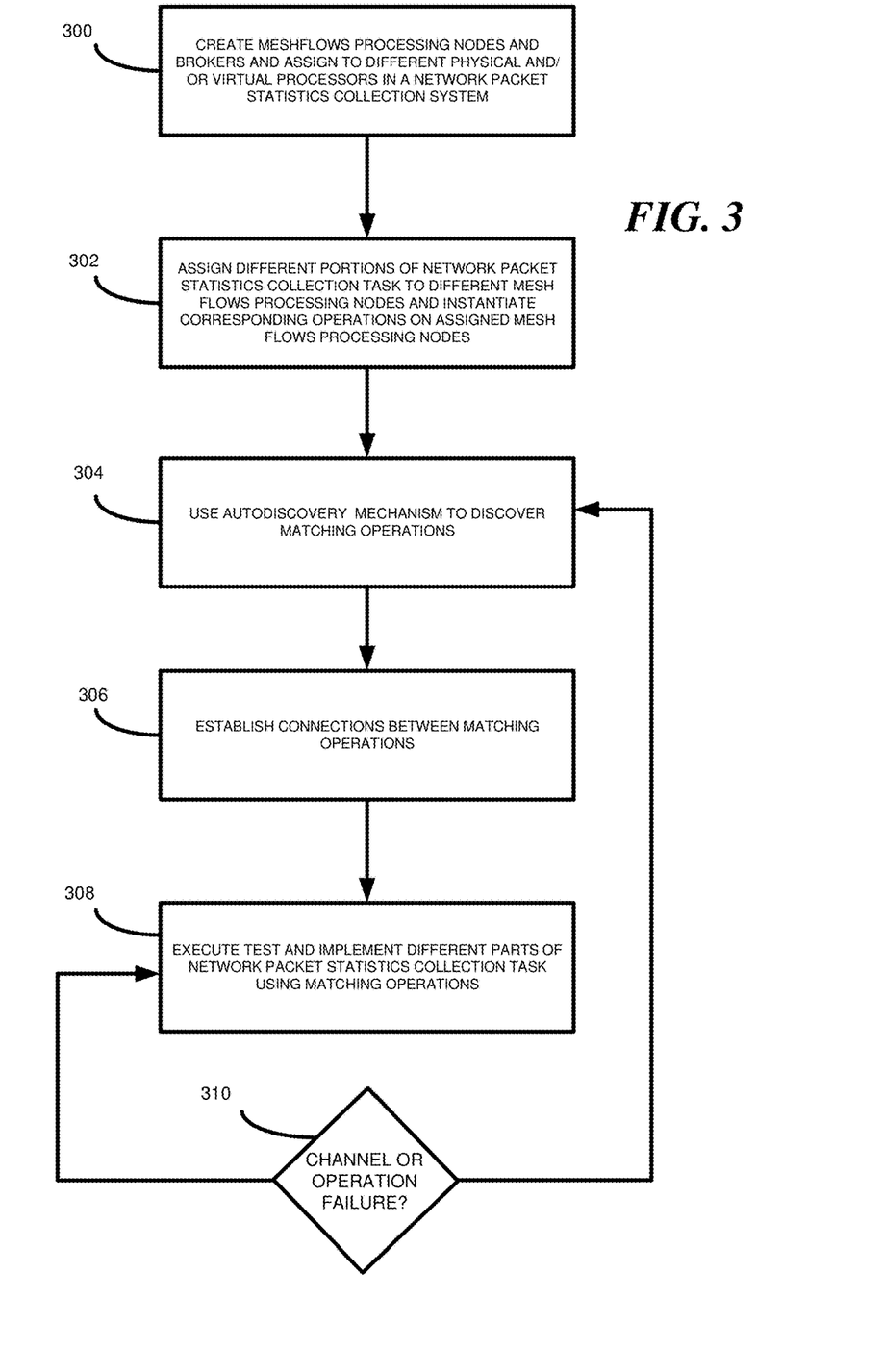
FIG. 3 is a flow chart illustrating an exemplary process for distributed network packet statistics collection in a test environment.

The first step to initiating the process for a distributed network test is to create mesh flows processing nodes 100 and broker 102 and allocate the mesh flows processing nodes 100 and broker 102 to processors 212. Referring to FIG. 3, in step 300, processing nodes and brokers are created and assigned to physical and/or to virtual processors in a network equipment statistics collection system. Step 300 may be implemented by client 204 or by an administrative computing platform separate from client 204.

In step 302, different portions of a network packet statistics collection task are assigned to different processing nodes and corresponding operations are instantiated on the assigned processing nodes. For example, each mesh flows processing node 100 may be assigned a different portion of a network packet statistics collection task. In one example, the task may be a table sort operation where the table contains network packet statistics. A processor 212 associated with port 208 may be assigned to the highest level of the table sort. A processor 212 associated with chassis card 206 may be allocated to receive the results from port processor 212 and perform a next level table sort on the data received from port processor 212. A Processors associated with client 204 may be allocated to receive the results from processor 212 of chassis card 206 and perform the lowest level table sort. Once the processor assignment is completed, operations are instantiated on the assigned processors.

In step 304, the auto-discovery mechanism described herein is used to discover matching operations. For example, as illustrated in FIG. 1, each operation may publish or subscribe to attributes by sending publish operation or subscribe operation messages to broker 102, and broker 102 may inform operations of other matching operations. Rather than subscribing to an individual identified operation, a subscribing operation subscribes to capabilities, and a publishing application publishes capabilities, where the capabilities are specified by attributes and corresponding values. Subscribing to and publishing capabilities allows the broker to identify matching operations by matching the capabilities of a publisher with a subscriber. In addition, if there is an operation or channel failure, replacement matching operations can be identified and assigned portions of the network packet statistics collection task. Continuing with the table sort example, operations executing on the processors associated with client 204, chassis card 206 and port cards 208 may auto-discover each other using the process illustrated in FIG. 1.

In step 306, connections are established between matching operations. For example, once matching operations are discovered, a subscribing operation may create a channel with a publishing operation by sending a create channel message to the publishing operation. The publishing operation preferably accepts the channel and sends confirmation to the subscribing operation. The process is repeated for each set of matching operations.

In step 308, a test is executed and statistics are generated using the matching operations. Continuing with a table sort example, one or more operations executing on one or more mesh flows processing nodes may implement higher level sort, provide the data to matching operations, which perform the next lowest level sort, which provide the data to the next level of processing nodes, and so forth. The mesh flows processing nodes that implement the final sort will contain the sorted data.

In step 310, it is determined whether a channel or operation failure has occurred. If a channel or operation failure has occurred, control returns to step 304 where the auto-discovery process is repeated to discover matching operations, establish channels between matching operations, and continue the test using the newly established channels. If a channel or operation failure has not occurred, test execution and statistics collection continues until the test ends.

Figure 4:
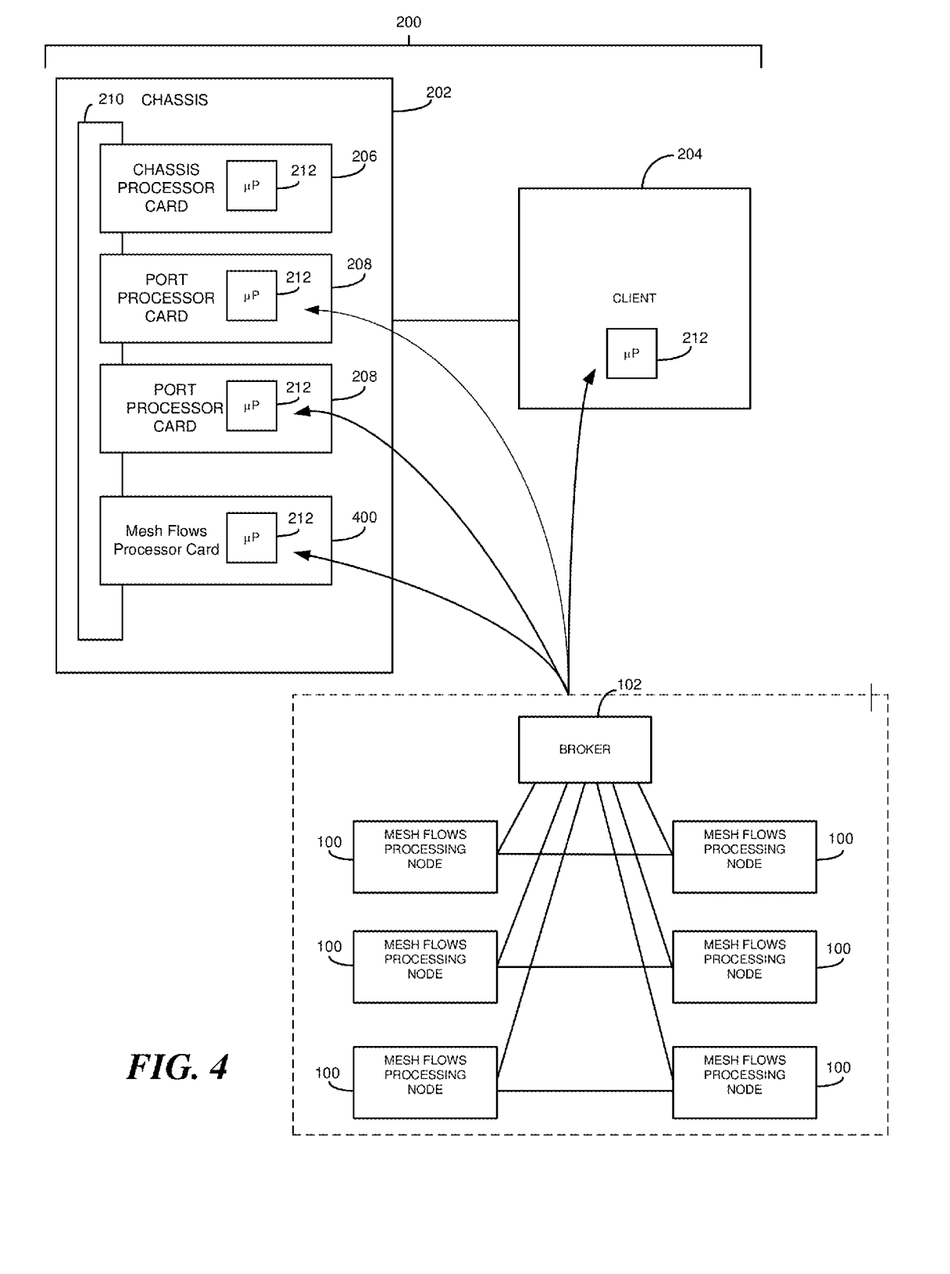
FIG. 4 is a block diagram illustrating exemplary assignment of the broker and mesh flows processing nodes to different processors in a network packet statistics collection system, where the system includes a dedicated mesh flows processor card.

The subject matter described herein is not limited to allocating processing nodes and operations among processors associated with chassis processor cards, port processor cards, and client processors. In an alternate example, as illustrated in FIG. 4, chassis 202 may include one or more mesh flows processing nodes dedicated processor cards for performing mesh flows broker and/or processing node operations. In such an example, operations and/or broker 102 may be allocated to dedicated mesh flows processing node processor card 500 in addition to processors 212 associated with client 204, chassis processor card 206, and port processor cards 208.

Figure 5:
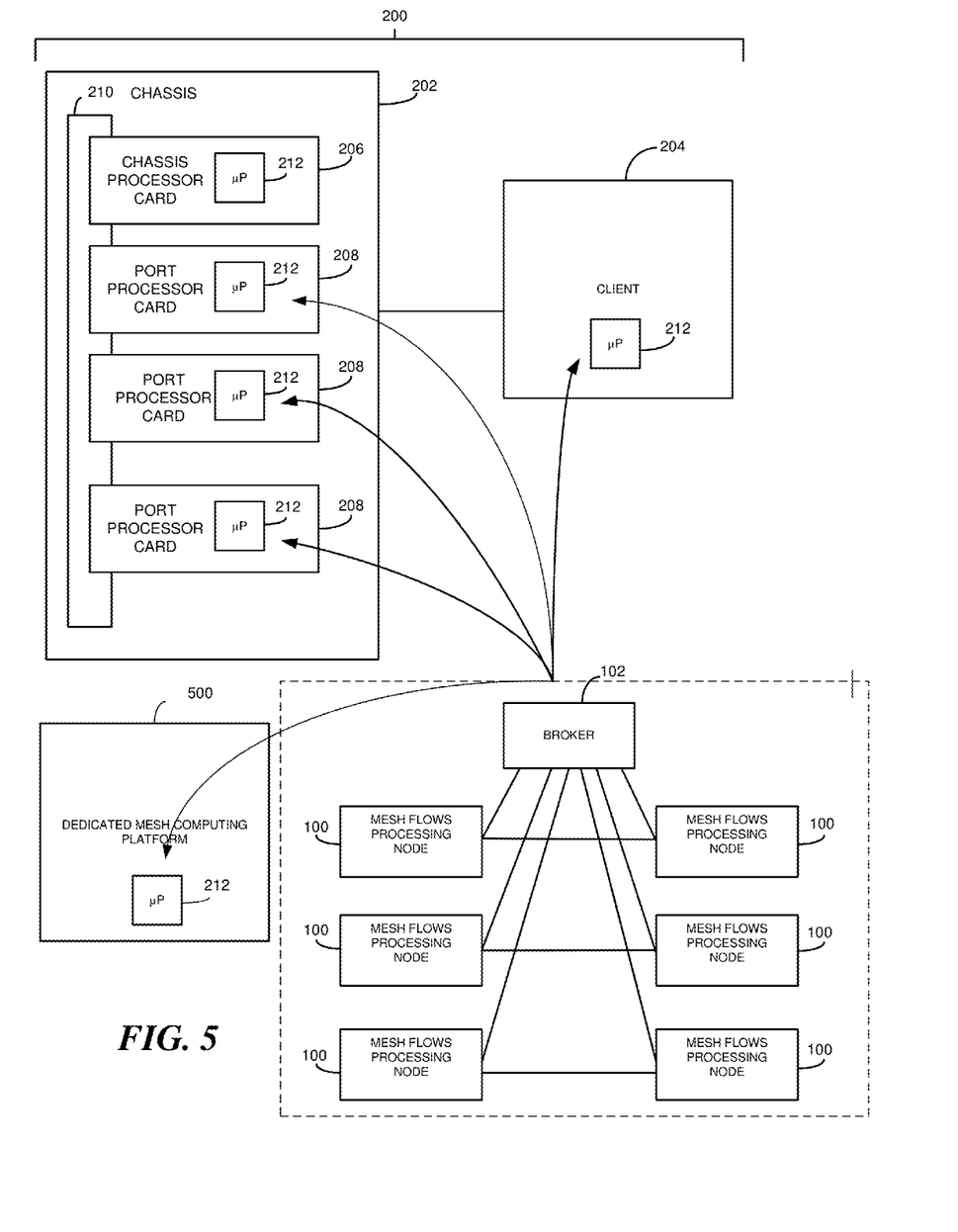
FIG. 5 is a block diagram illustrating exemplary assignment of the broker and mesh flows processing nodes to different processors in a network packet statistics collection system, where at least some of the mesh flows processing nodes are assigned to a processor on a dedicated mesh flows computing platform.

In yet another example, a processor on a dedicated mesh flows processing platform separate from chassis 202 and client 204 may be used to perform at least some of the network statistics collection task. FIG. 5 illustrates such an example. In FIG. 5, dedicated mesh flows processing platform 500 includes a one or more processors 212. Broker 102 and/or one or more of mesh flows processing nodes 100 may be allocated to processor 212 of dedicated mesh flows processing node 200.

Figure 6:
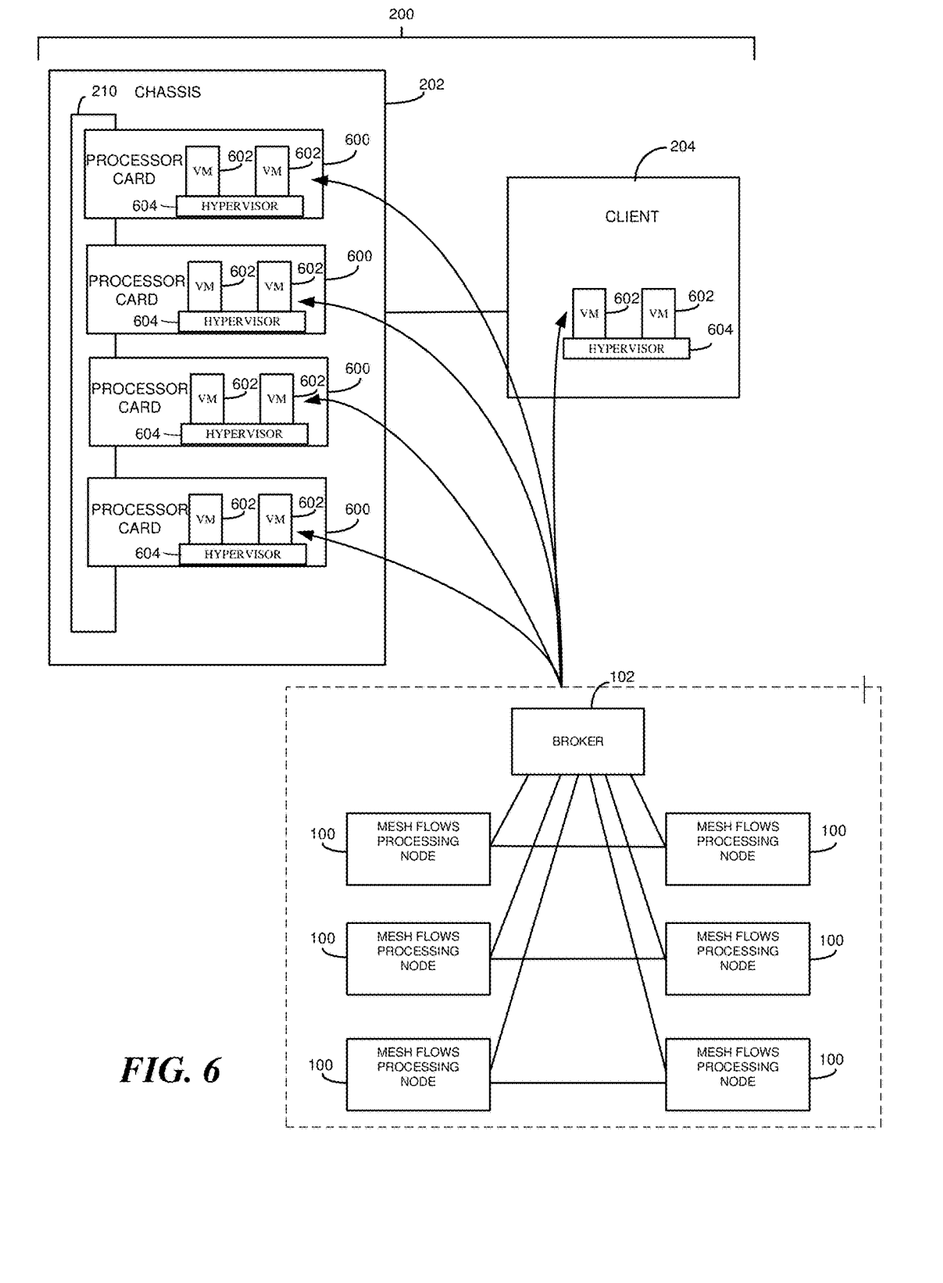
FIG. 6 is a block diagram illustrating exemplary assignment of the broker and mesh flows processing nodes to different virtual machines and a network packet statistics collection system.

In yet another example, mesh flows processing nodes 100 and broker 102 may be allocated to different virtual machines of a network equipment test system or of a separate dedicated processing platform. FIG. 6 illustrates such an example. In FIG. 6, network packet statistics collection system 200 includes a plurality of processor cards 600 on which one or more virtual machines 602 execute. Each virtual machine 602 executes on top of a hypervisor layer 604 which virtualizes the underlying hardware, which is not shown in FIG. 6 for simplicity. Client 204 may also include virtual machines 602 and hypervisor 604. Mesh flows processing nodes 100 and broker 102 may be allocated among virtual machines 602 in the same manner described above with regard to physical processors.

Figure 7:
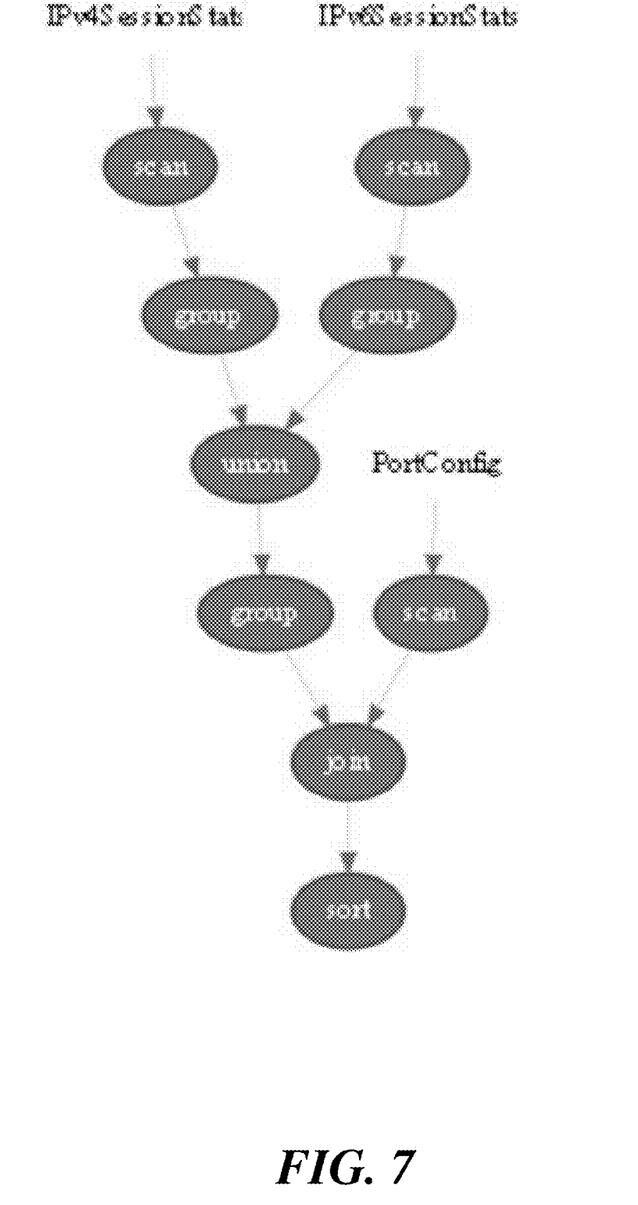
FIG. 7 is an abstract syntax tree representation of a network packet statistics collection task.

As stated above, according to one aspect of the subject matter described herein, different parts of a network packet statistics collection task are distributed among different processing nodes in a network packet statistics collection system. In one exemplary implementation, the scheduler that may be implemented on any of the processors illustrated in FIG. 2 or 4-6, takes a logical statistics query plan and builds a distributed data flow graph are assigned to different processors in the system. FIG. 7 illustrates an example of a data flow graph that may be generated for extracting network packet statistics from a table of IP version 4 session statistics and IP version 6 sessions statistics. Table 1 shown below illustrates an example of session statistics that may be collected and require further processing.

TABLE 1

Example Network Packet Statistics for IPv4 or IPv6 Packets

| PGID | Session ID | Session State | Topology ID | Port ID | Device Group ID | Protocol ID | Protocol Type |
|---|---|---|---|---|---|---|---|
| PGID1 | | | | | | | |
| PGID2 | | | | | | | |
| PGID3 | | | | | | | |

In Table 1, a collection of statistics may be collected for each perceived packet having a particular packet group identifier. As each new packet group identifier is encountered, a table such as that illustrated in FIG. 1 may grow large, potentially overwhelming a single processor, such as processor 212 of client machine 104 that combines tables from multiple different ports.

Rather than collecting statistics at each port using the port processor of that port and then having each port forward its statistics to client processor 104 for combination, the operations and mesh flows processing nodes described herein may be distributed among processors in a hierarchical manner to reduce the processing burden over implementations where a single processor performs all of the statistics collection.

In FIG. 7, the top most scanned modes simply read data from the table. The group nodes may group one or more rows together into a single row. For example, it may be desirable to create a row that corresponds to session state (i.e., up or down) instead of having rows that correspond to sessions. The group operations may be used to perform such a merger of rows. The union node illustrated in FIG. 7 is an operation that takes the same type of data coming from two different paths (IPv4 and IPv6 in this example) and combines the data into a single table. For example, if there were two tables of statistics, each with ten rows, the result of the union operation would be to create a single table with 20 rows.

If data is being collected on a client node, the client node may have its own name for a particular data. The scan operation that receives the port configuration may provide the client to sign name to the join node, which replaces the port processors named for a port with the client processors name. Finally, the sort nodes sort the combined statistics according to user specified criteria, such as IP address.

Figure 8:
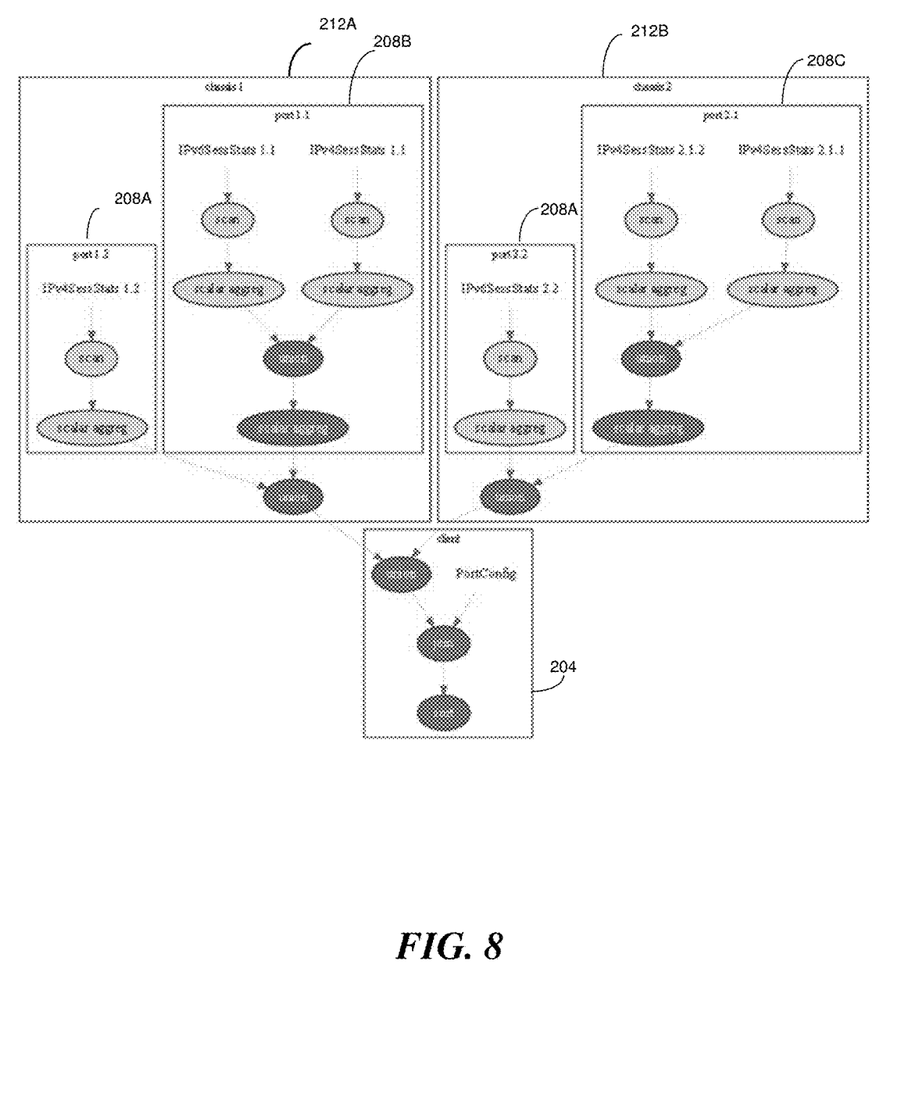
FIG. 8 is a block diagram illustrating assignment of tasks in the abstract syntax tree representation of FIG. 7 to different processors in a network packet statistics collection system.

FIG. 8 illustrates an example of exemplary assignment of the processes in the data flow draft in FIG. 7 to different processors in a network packet statistics collection system. In the illustrated example, the system includes two chassis 202A and 202B. Each chassis includes two port processors cards 208A and 208B. The system further includes client node 204, which receives the statistics processed by each of the port processor cards and combines and sorts the statistics. It is understood that the connections between the various nodes illustrated in FIG. 8 would be formed using the auto-discovery process illustrated in FIG. 1. Accordingly, by allocating different parts of a network packet statistics collection task among different nodes in a network packet statistics collection system and using an auto discover mechanism to discover and connect the nodes, the subject matter described herein increases the flexibility and scalability over conventional systems where the client is responsible for all of the statistics processing.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for distributed network packet statistics collection in a test environment, the method comprising:
    instantiating first and second operations that implement different portions of a network packet statistics collection task on processing nodes implemented on different processors in a network packet statistics collection system;
    utilizing an auto-discovery mechanism for the second operation to subscribe to a set of capabilities and identify the first operation as a matching operation, wherein utilizing the auto-discovery mechanism includes:
        publishing a set of attributes from the first operation to a broker;
        at the second operation, subscribing, by transmitting a message to the broker, to an operation having the set of attributes;
        receiving, at the second operation and from the broker, notification of the matching operation, the notification including information for connecting to the first operation; and
        establishing a channel between the first and second operations; and
    executing the network packet statistics collection task, where the first and second operations perform the different portions of the network packet statistics collection task.

2. The method of claim 1 wherein instantiating the first and second operations includes instantiating the first and second operations on processors associated with at least one of network port, a client, and test system chassis.

3. The method of claim 1 wherein instantiating the first and second operations includes instantiating the first and second operations on at least one of: a dedicated processor within a chassis of the network statistics collection system or a dedicated processor separate from the network packet statistics collection system.

4. The method of claim 1 wherein instantiating the first and second operations includes instantiating the first and second operations on different virtual machines associated with the network packet statistics collection system.

5. The method of claim 1 wherein publishing the set of attributes includes publishing a processing node name, a channel accept report, and an operation ID to the broker.

6. The method of claim 1 comprising, in response to failure of the channel, utilizing the auto-discovery mechanism to identify matching operations to perform the network packet statistics collection task.

7. The method of claim 1 wherein the network packet statistics collection task includes recording different statistics for simulated packets by packet group identifier.

8. The method of claim 1 wherein the network packet statistics collection task includes combining statistics from packets received on different ports of the network packet statistics collection system.

9. The method of claim 1 comprising generating an abstract syntax tree representation of the network packet statistics collection task and utilizing the abstract syntax tree representation to assign the different portions of the network packet statistics collection task to the processing nodes.

10. A system for distributed network packet statistics collection in a test environment, the system comprising:
a network packet statistics collection system including a chassis and a client, each including a processor;
first and second processing nodes for executing on one or more of the processors;
first and second operations that implement different portions of a network packet statistics collection task for executing on the first and second processing nodes;
wherein the first and second operations are configured to utilize an auto-discovery mechanism for the second operation to subscribe to a set of capabilities and identify the first operation as a matching operation, wherein the first operation is configured to publish a set of attributes to a broker and wherein the second operation is configured to utilize the auto-discovery mechanism by:
subscribing, by transmitting a message to the broker, to an operation having the set of attributes; and
receiving, at the second operation and from the broker, notification of the matching operation, the notification including information for connecting to the first operation; and
wherein the first and second operations are configured to connect to each other and execute the network packet statistics collection task, where the first and second operations perform the different portions of the network packet statistics collection task.

11. The system of claim 10 wherein the first operation executes on a processor of a first port processor card, the second operation executes on a processor of a second port processor card, and wherein the broker executes on a processor of a chassis processor card.

12. The system of claim 10 wherein one of the first and second operations and the broker is configured to execute on a dedicated processor within a chassis of the network equipment test system or a dedicated processor separate from the network packet statistics collection system.

13. The system of claim 10 wherein the first and second operations and the broker are configured to execute on different virtual machines associated with the network packet statistics collection system.

14. The system of claim 10 wherein the first operation is configured to publish a processing node name, a channel accept report, and an operation ID to the broker.

15. The system of claim 10 wherein the first and second operations are configured to repeat the publishing and the subscribing to identify matching operations to perform the network packet statistics collection task.

16. The system of claim 10 wherein the network packet statistics collection task includes recording different statistics for simulated packets by packet group identifier.

17. The system of claim 10 wherein the network packet statistics collection task includes combining statistics from packets received on different ports of the network packet statistics collection system.

18. The system of claim 10 wherein the client is configured to generate an abstract syntax tree representation of the network packet statistics collection task and use the abstract syntax tree representation to assign the different portions of the network packet statistics collection task to the processing nodes.

19. A non-transitory computer readable medium having stored thereon executable instructions that when executed by a processor of a computer control the computer to perform steps comprising:
instantiating first and second operations that implement different portions of a network packet statistics collection task on processing nodes implemented on different processors in a network packet statistics collection system;
utilizing an auto-discovery mechanism for the second operation to subscribe to a set of capabilities and identify the first operation as a matching operation, wherein utilizing the auto-discovery mechanism includes:
publishing a set of attributes from the first operation to a broker;
at the second operation, subscribing, by transmitting a message to the broker, to an operation having the set of attributes;
receiving, at the second operation and from the broker, notification of the matching operation, the notification including information for connecting to the first operation; and
establishing a channel between the first and second operations; and
executing the network packet statistics collection task, where the first and second operations perform the different portions of the network packet statistics collection task.

* * * * *